United States Patent [19]

Perttola

[11] Patent Number: 6,164,193
[45] Date of Patent: Dec. 26, 2000

[54] POPPING KETTLE ASSEMBLY

[75] Inventor: A. Scott Perttola, Fairfield, Ohio

[73] Assignee: Gold Medal Products Co., Cincinnati, Ohio

[21] Appl. No.: 09/426,599

[22] Filed: Oct. 26, 1999

Related U.S. Application Data

[63] Continuation of application No. 09/037,774, Mar. 10, 1998, Pat. No. 5,979,301.

[51] Int. Cl.⁷ ....................................................... A23L 1/18
[52] U.S. Cl. .......................... 99/323.9; 99/323.5; 220/297
[58] Field of Search ................................ 99/323.5, 323.9, 99/323.6, 323.7, 323.8; 220/293, 297, 300, 301

[56] References Cited

U.S. PATENT DOCUMENTS

| 1,803,847 | 5/1931 | Eillis ........................................ 220/297 |
| 2,254,271 | 9/1941 | Cretors . |
| 2,537,744 | 1/1951 | Cretors . |
| 3,076,577 | 2/1963 | Craig ........................................ 220/297 |
| 3,854,582 | 12/1974 | Martinelli ............................ 220/300 X |
| 4,333,580 | 6/1982 | Sweigart, Jr. . |

Primary Examiner—Reginald L. Alexander
Attorney, Agent, or Firm—Wood, Herron & Evans, LLP

[57] ABSTRACT

An improved popping kettle assembly includes a kettle chamber and a lid that are releasably engageable with each other upon relative movement of the chamber and lid. The kettle chamber has a series of projections formed on an upper edge, and the lid has a series of relieved areas that are adapted to cooperate with the projections on the chamber. Preferably, the projections are a series of tabs and the relieved areas are a series of slots formed through the thickness of the lid. The slots in the lid are first placed in registration with the tabs on the kettle chamber, and the lid is then rotated relative to the kettle chamber to establish a reliable engagement between the chamber and lid.

8 Claims, 2 Drawing Sheets

POPPING KETTLE ASSEMBLY

This application is a continuation of Ser. No. 09/037,774, filed Mar. 10, 1998, now U.S. Pat. No. 5,979,801.

FIELD OF THE INVENTION

The present invention relates generally to corn popping apparatus and, more particularly, to an improved popping kettle assembly for use in popcorn machines.

BACKGROUND OF THE INVENTION

In the past, it has been known to provide a popcorn kettle assembly having a kettle chamber adapted to receive raw corn, oil and salt, and a lid to cover the chamber during the popping operation. The kettle chamber is heated in a known manner to pop the popcorn within the chamber while the lid is secured to the chamber through fasteners to prevent the popcorn and from being released until the popping operation is completed. The lid may include a hinged portion that fully opens as the volume of popped popcorn increases within the chamber. When the popping operation is completed, the kettle assembly is clumped to release the popped popcorn for service, and the process may then be repeated.

During the popping operation, the lid must be reliably secured to the kettle chamber. If the lid should pop off, the batch of popcorn and other ingredients is wasted and, more seriously, hot oil may splatter from the heated kettle and injure those in the vicinity of the popcorn machine.

To substantially eliminate this possibility, it has been known to use fasteners, such as latches, spring clips, wing nuts and the like, to firmly secure the lid to the kettle chamber. While these and other fasteners have served their purpose of securing the lid to the kettle chamber, they have several drawbacks.

From a safety standpoint, the fasteners may loosen during the popping operation and become commingled with the popped popcorn within the kettle. If this occurrence goes unnoticed by the serving attendants, the fastener component may be served to a customer in the bag or box of popped popcorn. From a health standpoint, the fasteners generally become contaminated over time with the oil and seasonings used in the popping operation. While the kettle and lid are cleaned on a regular basis, it is possible that the fasteners may not receive the same attention or care. Additionally, the loose fasteners must be handled separately from the kettle chamber and lid, thereby adding to the time and steps required to assemble and disassemble the popping kettle assembly.

Accordingly, it is has been an objective of the present invention to provide an improved popcorn kettle assembly that reliably and safely secures the kettle lid to the kettle chamber. A further objective of the present invention has been to provide an improved popcorn kettle assembly that may be easily assembled, disassembled and cleaned.

SUMMARY OF THE INVENTION

To these ends, a preferred embodiment of the present invention contemplates an improved popping kettle assembly that eliminates loose fasteners for establishing an engagement between the kettle chamber and the lid. In accordance with the present invention, the kettle chamber and lid are releasably engageable with each other solely upon relative movement of the chamber and the lid. More particularly, the kettle assembly includes a kettle chamber having a bottom and a side wall extending upwardly from the bottom. A series of projections, preferably in the form of tabs, are formed on or adjacent an upper circumferential edge of the side wall. Each of the tabs preferably includes a lug portion having a longitudinal axis extending generally parallel to the upper edge of the side wall. Each of the tabs has a notch portion that is formed between a lower edge of the lug portion and the upper edge of the kettle side wall.

The kettle lid includes a series of relieved areas, preferably in the form of slots, formed adjacent a circumferential edge of the lid. The slots of the lid are adapted to cooperate with the tabs of the kettle chamber so that the lid is releasably engaged in the notch portions of the tabs when the lid is slightly rotated on the top of the kettle chamber.

It will be appreciated that the formation of projections and relieved areas on the kettle chamber and lid, respectively, provides a reliable and safe engagement of the lid and kettle chamber that eliminates the loose fasteners heretofore required in known popcorn kettle assemblies. Moreover, the projections and relieved areas of the present invention provide an improved kettle assembly that eliminates the health and safety concerns associated with popping kettle assemblies of the prior art.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
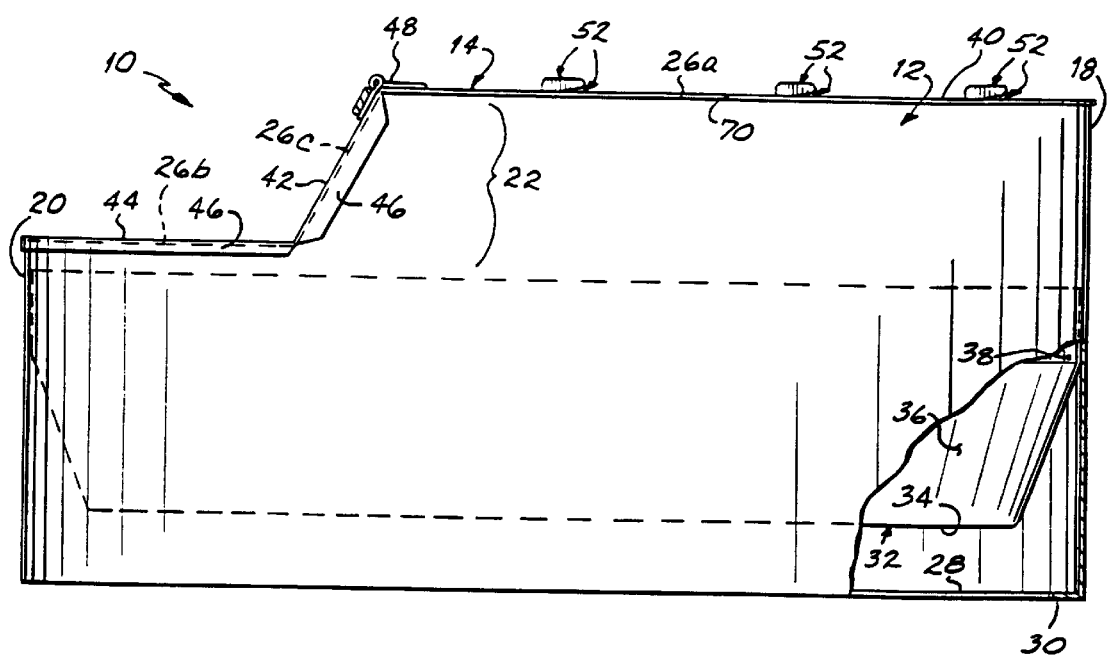
FIG. 1 is a side elevational view of an improved popping kettle in accordance with the principles of the present invention.

Turning now to the drawings, there is shown in FIG. 1 a side elevational view of an improved popping kettle assembly 10 in accordance with the principles of the present invention for use in a conventional popcorn machine. As will be described in detail below, kettle assembly 10 includes a kettle chamber 12 and a kettle lid 14 that are particularly constructed to releasably engage each other upon relative movement of the kettle chamber 12 and lid 14. The cooperating engagement of the kettle chamber 12 and lid 14 in accordance with the principles of the present invention eliminates loose fastening components, such as clips, wing nuts, latches and the like, that were heretofore required to establish a reliable engagement between the kettle chamber and lid in known prior art popping kettle assemblies.

Further referring to FIG. 1, the kettle chamber 12 preferably has an annular side wall 16 that includes a rear portion 18, a lower front portion 20, and an intermediate inclined portion 22 formed between the rear and front portions 18, 20. Rear portion 18 has a peripheral edge 26a, while lower front portion has a peripheral edge 26b. The intermediate inclined portion 22 provides an inclined edge or step 26c on an upper circumferential edge of the kettle assembly 10 which is defined by edges 26a–26c. An inwardly directed flange 28 is formed along a bottom edge 30 of the annular side wall 16. A kettle bottom 32 is welded or otherwise joined to the side wall 16, and includes a generally planar bottom wall 34 and a conical side wall 36 that terminates in an upstanding annular wall 38.

While not shown, it will be appreciated by those skilled in the art that heaters are positioned beneath and in contact with the bottom wall 34 to heat the kettle chamber 12 during a popping operation. The bottom wall 34 includes an aperture (not shown) to accommodate the shaft of an agitator (not shown) positioned in the kettle chamber 12 to stir raw corn, oil and salt that is charged in the kettle assembly 10.

Figure 2:
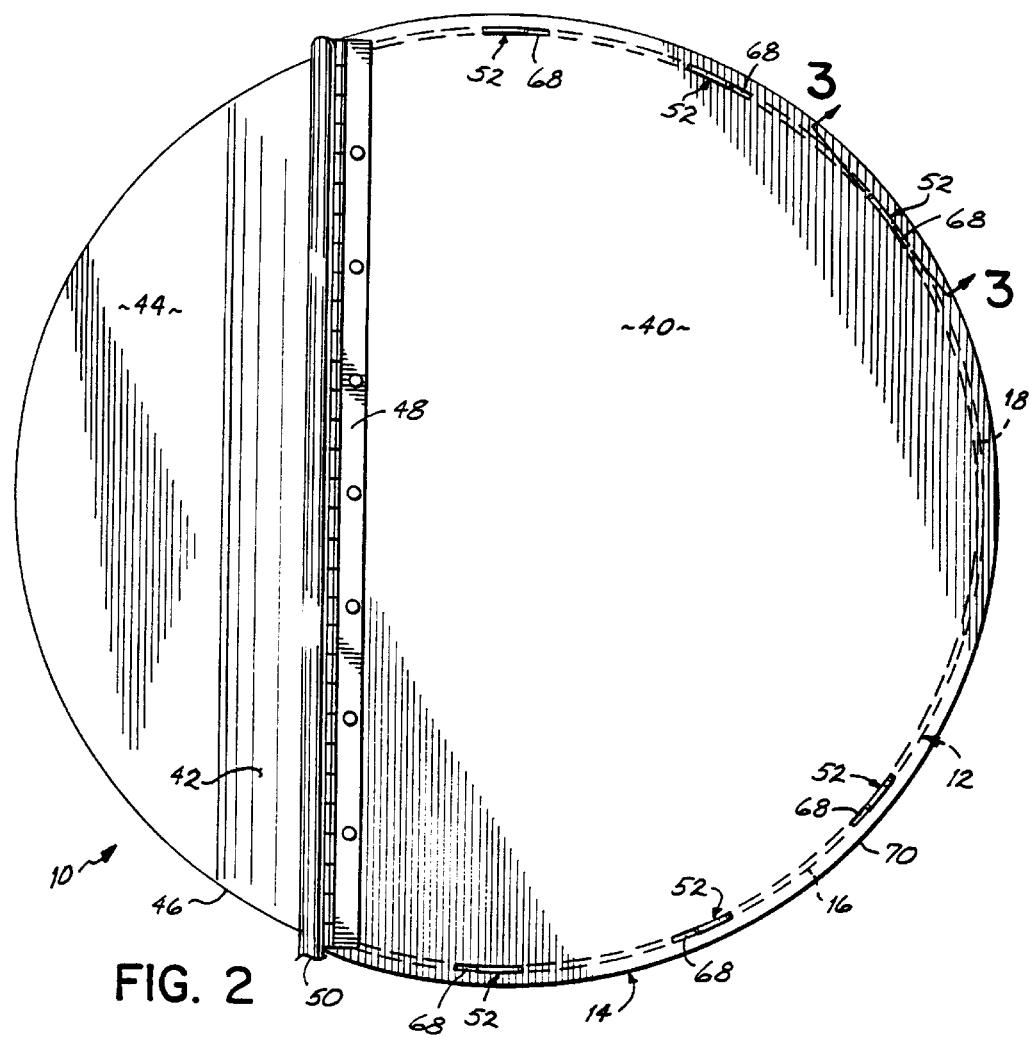
FIG. 2 is a top plan view of a kettle lid releasably engaged on the kettle lid illustrated in FIG. 1.

As best understood with reference to FIGS. 1 and 2, the lid 14 preferably has a rear portion 40, an inclined intermediate portion 42, and a front portion 44. Lid 14 is dimensioned to substantially cover an opening defined by the upper circumferential edge 26 of the kettle chamber 12 when the lid 14 is positioned on the upper edge 26. The front and inclined intermediate portions 44, 42 of lid 14 preferably have downturned ears or flanges 46 that close against the upper circumferential edge 26 of the kettle chamber 12. While not shown, it will be appreciated that lid 14 may include a kettle funnel to direct pumped oil into the kettle assembly 10 during a popping operation.

As is well known in the art, the front and inclined intermediate portions 44, 42 of lid 14 are pivotally connected along hinge 48 to the rear portion 40 of the lid 14. A counterbalance weight (not shown) is secured to the inclined intermediate portion 42 of lid 14 through a counterbalance arm 50. As slight upward pressure is applied to the front portion 44 of lid 14 by popped popcorn expanding in the kettle chamber 12, the counterbalance weight is moved to an overbalanced position to cause the front and inclined portions 44, 42 of lid 14 to swing to a fully open position.

Figure 3:
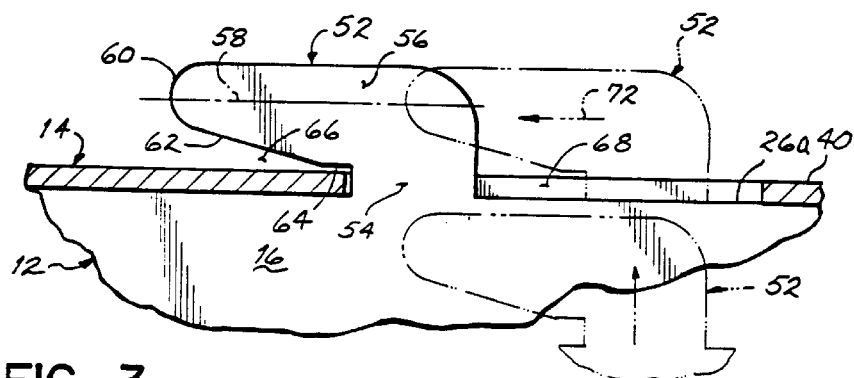
FIG. 3 is a partial cross-sectional view taken along line 33 of FIG. 2 showing assembly

Referring to FIGS. 2 and 3, the kettle assembly 10 includes a series of spaced projections, preferably in the form of tabs 52, that are preferably formed on the upper circumferential edge 26 of the kettle chamber 12. More particularly, the tabs 52 are formed on the peripheral edge 26a of the kettle rear portion 18. As shown most clearly in FIG. 3, each of the tabs 52 includes a vertically oriented leg portion 54 that is integrally connected to a lug portion 56. Each lug portion 56 has a longitudinal axis 58 oriented generally parallel to the upper edge 26 of the kettle chamber 12. The free ends 60 of lug portions 56 are preferably rounded, and include lower inclined edges 62 and edges 64 that terminate adjacent the leg portions 54. The lower edges 62, 64 of lug portions 56 form notch portions 66 with the upper edge 26 of the kettle chamber 12. Preferably, six tabs 52 are formed on the upper edge 26 of the kettle chamber 12 as shown most clearly in FIG. 2.

As best understood with reference to FIG. 2, the lid 14 has a series of relieved areas, preferably in the form of spaced slots 68, that are formed through the thickness of the lid 14. The slots 68 are positioned adjacent a circumferential edge 70 of the rear lid portion 40, and each slot 68 has a length dimension which is preferably as great as the length dimension of the tabs 52. As shown in FIG. 3, the rear lid portion 40 is adapted to be placed on the peripheral edge 26a of the kettle's rear portion 18 by registering and inserting tabs 52 through respective slots 68 formed in the rear lid portion 40. With the rear lid portion 40 resting on the peripheral edge 26a, and the front and intermediate lid portions 44, 42 at least partially raised, the lid 14 and kettle chamber 12 are moved relative to each other, shown diagrammatically by arrow 72 in FIG. 3, to cause the rear lid portion 40 to be releasably engaged between the lug portions 56 and the upper edge 26 of kettle chamber 12. The engagement formed between the kettle chamber 12 and lid 14 prevents upward movement of lid 14 as the volume of popped popcorn increases in the kettle assembly 10 during a popping operation. Preferably, six slots 68 are formed in the lid 14 as shown most clearly in FIG. 2, with each slot 68 preferably having a midpoint that is offset about 3° relative to a centerline of each respective tab 52. By placing the lid 14 on the upper edge 26 of kettle chamber 12, and then rotating the lid 14 relative to the kettle chamber 12 through a small angular movement, a reliable, yet releasable engagement is established between the lid 14 and the kettle chamber 12.

Thus, it will be appreciated that the formation of the projections and relieved areas on the kettle chamber and lid, respectively, provide releasable engagement of the lid 14 and kettle chamber 12 to replace the loose fasteners heretofore required in known popcorn kettle assemblies. Moreover, the projections and relieved areas of the present invention eliminate the health and safety concerns associated with popping kettle assemblies of the prior art.

While the present invention has been illustrated by a description of various embodiments and while these embodiments have been described in considerable detail, it is not the intention of the applicants to restrict or in any way limit the scope of the appended claims to such detail.

For example, it is contemplated that the projections may be formed as non-integral components that are secured on or adjacent the upper circumferential edge 26 of the kettle chamber 12. It is also contemplated in an alternative embodiment that the components could be reversed, with the relieved areas formed in association with the kettle chamber 12, and the projections formed in association with the lid 14. Moreover, the configuration of the projections and relieved areas may be changed so long as a reliable and releasable engagement is established between the lid 14 and kettle chamber 12 upon relative movement of the components. The cooperation of the projections and relieved areas of the present invention are readily adaptable to a wide variety of kettle assembly designs. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An improved popping kettle assembly comprising the combination of:

a kettle chamber for receiving popcorn kernels and having a bottom and a side wall extending upwardly from said bottom;

a plurality of projections formed adjacent an upper edge of said side wall; and a lid having a first portion and a second portion, the second portion being pivotably coupled with said first portion to pivot and allow contents of the kettle chamber to escape when the kettle chamber is tilted and when the popcorn kernels pop and expand above the upper edge of the side wall, the lid further having a plurality of relieved areas positioned in said first portion and adapted to receive said projections and releasably secure said lid first portion with said kettle chamber by cooperation between the projections and relieved areas, the lid second portion remaining free to pivot when the lid first portion is secured.

2. The improved popping kettle assembly of claim 1 wherein said projections comprise a plurality of tabs formed along the upper edge of said side wall.

3. The improved popping kettle assembly of claim 1 wherein said relieved areas comprise a plurality of slots formed adjacent a circumferential edge of said lid.

4. The improved popping kettle assembly of claim 2 wherein each of said tabs includes a lug portion having a longitudinal axis that extends generally parallel to the upper edge of said side wall.

5. The improved popping kettle assembly of claim 4 wherein each of said tabs includes a notch portion formed between a lower edge of said lug portion and the upper edge of said side wall.

6. The improved popping kettle assembly of claim 5 wherein said lid is releasably engaged in said notch portions upon relative movement of said lid and said side wall.

7. The improved popping kettle assembly of claim 1 wherein said lid first portion comprises a rear lid portion, and said lid second portion comprises an intermediate lid portion, and a front lid portion.

8. An improved popping kettle assembly, comprising the combination of:

a popping kettle chamber for receiving popcorn kernels;

a lid having a first portion and a second portion which is pivotably coupled with said first portion to pivot and allow contents of the kettle chamber to escape when the kettle chamber is tilted and when the popcorn kernels pop and expand above an upper edge of the kettle chamber;

a plurality of projections associated with one of said kettle chamber and said lid first portion; and a plurality of relieved areas associated with the other of said kettle chamber and said lid first portion;

said relieved areas being adapted to receive said projections to releasably secure said lid first portion with said kettle chamber by cooperation between the projections and relieved areas, the second portion remaining free to pivot when the lid first portion is secured.

* * * * *

UNITED STATES PATENT AND TRADEMARK OFFICE
CERTIFICATE OF CORRECTION

PATENT NO. : 6,164,193  
DATED : December 26, 2000  
INVENTOR(S) : A. Scott Perttola Page 1 of 1

It is certified that error appears in the above-identified patent and that said Letters Patent is hereby corrected as shown below:

Column 1,  
Line 23, reads "clumped", and it should read -- dumped --.

Column 2,  
Line 41, reads "along line 33", and it should read -- along line 3-3 --.

Signed and Sealed this

Eighth Day of January, 2002

*Attest:*

JAMES E. ROGAN